United States Patent [19]
Benway

[11] Patent Number: 5,956,766
[45] Date of Patent: Sep. 28, 1999

[54] STROLLER BLANKET

[76] Inventor: Jeanette Roberta Benway, 53 Beverly Road, Mt. Kisco, N.Y. 10549

[21] Appl. No.: 09/163,125

[22] Filed: Sep. 29, 1998

Related U.S. Application Data

[60] Provisional application No. 60/060,305, Sep. 29, 1997.

[51] Int. Cl.[6] .............................. A41B 1/12; A41D 1/12; A41D 11/00
[52] U.S. Cl. ........................................... 2/69; 2/69.5; 2/75
[58] Field of Search .................................. 2/69, 69.5, 75, 2/85, 80; 5/603, 94, 413 R, 482; 297/250.1

[56] References Cited

U.S. PATENT DOCUMENTS

| | | |
|---|---|---|
| 1,264,971 | 5/1918 | Pickles . |
| 2,469,700 | 5/1949 | Petrucelli . |
| 2,712,133 | 7/1955 | Coleman . |
| 2,716,239 | 8/1955 | Barndollar . |
| 4,363,141 | 12/1982 | Doster . |
| 5,168,579 | 12/1992 | Marshall . |
| 5,283,909 | 2/1994 | Hill . |
| 5,781,946 | 7/1998 | McEntire et al. . |

*Primary Examiner*—John J. Calvert
*Assistant Examiner*—Shirra L. Jenkins
*Attorney, Agent, or Firm*—St.Onge Steward Johnston & Reens LLC

[57] ABSTRACT

A blanket for warming a child seated in a stroller having a frame, a seat, and push handles is provided. The blanket includes a sack portion for receiving the legs of the child seated in the stroller, the sack portion having side walls, a rear wall, and a front wall. The blanket also includes an upper portion for covering the torso of the child seated in the stroller. The upper portion includes a front wall and side walls, each of the side walls including an upper and a lower section. The front wall of the upper portion is attached to the lower sections of the side walls of the upper portion such that the front wall forms a flap which may cover the chest of the child seated in the stroller during particularly cold weather, and which may be folded down during more mild weather and when the child is to exit the stroller. A set of upper fastener strips is attached to the side walls of the upper portion for attaching the blanket to the push handles of the stroller, and a set of lower fastener strips is attached to the side walls of the upper portion for attaching the blanket to the frame of the stroller proximate to the seat of the stroller.

15 Claims, 4 Drawing Sheets

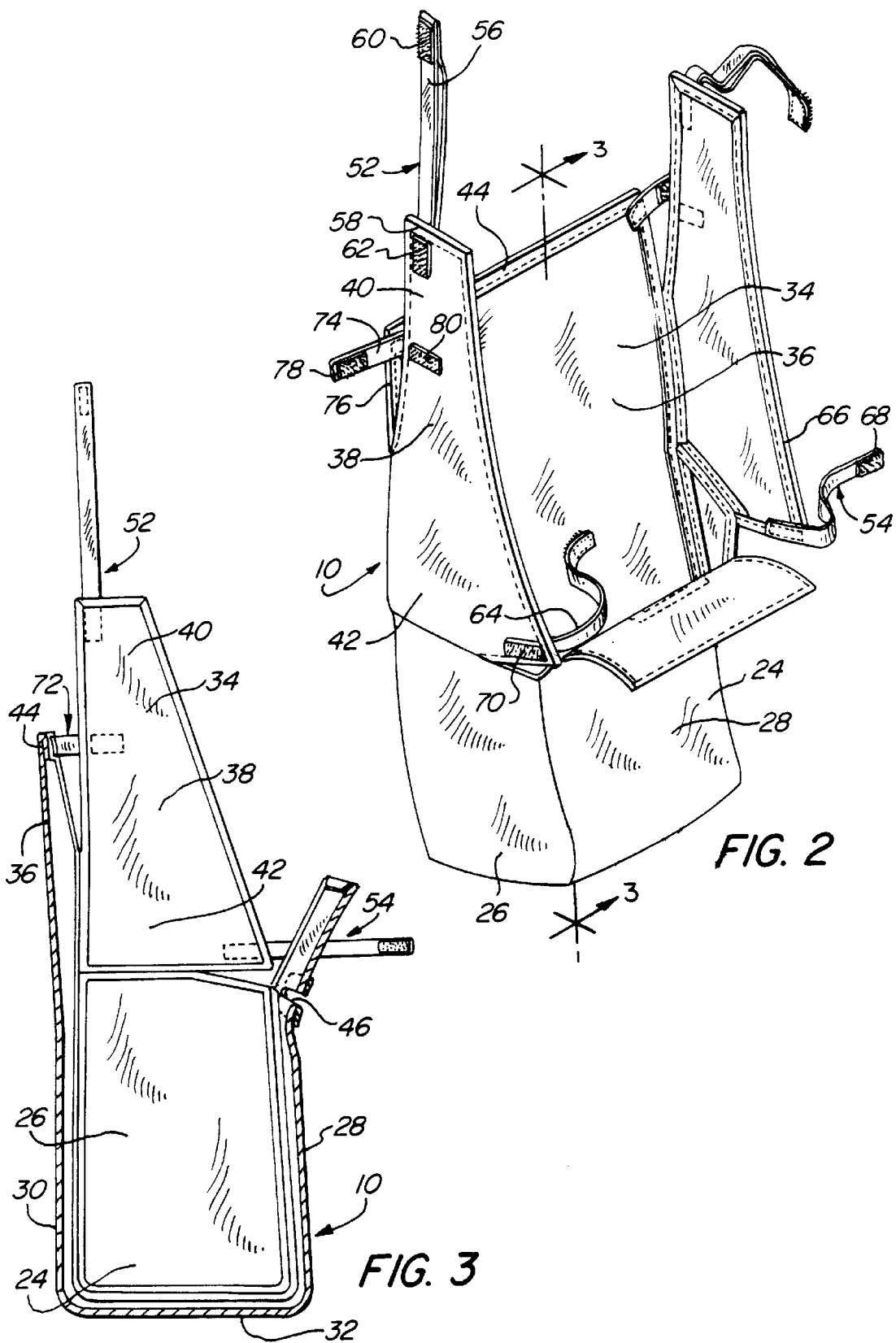

STROLLER BLANKET

REFERENCE TO COPENDING APPLICATION

This application claims priority from U.S. Provisional application Ser. No. 60/060,305 filed Sep. 29, 1997.

FIELD OF THE INVENTION

The present invention relates generally to a blanket for warming children, and more particularly to a blanket for warming a child seated in a stroller and which is attachable to the stroller so that the blanket does not fall off the child or get tangled in the wheels of the stroller.

BACKGROUND OF THE INVENTION

Young children are often required to sit in strollers, for example, during walks and shopping trips with their parents. These walks and the like often occur during cold weather, and as such the children must be wrapped warmly for comfort and health reasons. The easiest way to accomplish this is to wrap the child in a blanket. This method, however, is not effective, as the blanket often will fall off the child or may get tangled in the wheels of the stroller. Several attempts have been made to design blankets to remedy these disadvantages, but these blankets each have disadvantages of their own.

U.S. Pat. No. 3,962,738 to Menditto and U.S. Pat. No. 4,823,405 to Porter both disclose baby bags in which an infant may be disposed and securely wrapped. The bags are bifurcated to form individual leg pockets. The baby, once wrapped, may be placed in a carriage or stroller. A disadvantage of both of these prior art designs is that they are restrictive and may therefore be uncomfortable. Especially in the case of young children over the age of approximately one year, such a restrictive design is unnecessary and undesirable from a comfort perspective. Another disadvantage is that no effective provision is made for attaching the baby bag to a stroller so that the bag does not slip off the child or get caught in the wheels of the stroller.

U.S. Pat. No. 5,735,004 to Wooten et al. discloses a water resistant baby blanket assembly which can be draped over a stroller and attached thereto. (See Wooten et al., FIG. 11). A disadvantage of this design is that because the blanket is draped over the entire stroller and is not snugly wrapped about the child, drafts of cold air may enter under the blanket and chill the child. Another disadvantage is that the blanket covers the child's head, which may frighten the child, and which does not allow for monitoring of the child's well being.

U.S. Pat. No. 5,437,061 to Kenner discloses a child's poncho which may be worn by a child or fit over a child seated in a stroller. The poncho includes a lower opening 12 which may be disposed over the seat of the stroller and an upper opening 26 which may be disposed over the handles of the stroller. A disadvantage of this prior art design is that the child may not be fully protected, as cold drafts may be allowed to enter the poncho through the openings. Another disadvantage is that the lower opening 12 of the poncho may slip off the stroller as the child moves about, thereby exposing the child to the elements. A further disadvantage is that the poncho is not easily attachable to and detachable from the stroller, as the openings must be slid over the handles and seat of the stroller, which may be difficult.

What is desired, therefore, is a blanket for warming a child seated in a stroller, which does not easily fall off the child seated in the stroller, which does not readily get tangled in the wheels of the stroller, which inhibits drafts of cold air from chilling the child, which is comfortable for the child seated in the stroller, and which is easily attachable to and detachable from the stroller.

SUMMARY OF THE INVENTION

Accordingly, it is an object of the present invention to provide a blanket for warming a child seated in a stroller.

Another object of the present invention is to provide a blanket having the above characteristics and which does not easily fall off the child seated in the stroller.

A further object of the present invention is to provide a blanket having the above characteristics and which does not readily get tangled in the wheels of the stroller.

Still another object of the present invention is to provide a blanket having the above characteristics and which inhibits drafts of cold air from chilling the child.

Yet a further object of the present invention is to provide a blanket having the above characteristics and which is comfortable for the child seated in the stroller.

Yet another object of the present invention is to provide a blanket having the above characteristics and which is easily attachable to and detachable from the stroller.

These and other objects of the present invention are achieved by provision of a blanket for warming a child seated in a stroller having a frame, wheels, a seat, and push handles. The blanket includes a sack portion for receiving the legs of the child seated in the stroller, the sack portion having side walls, a rear wall, and a front wall. The blanket also includes an upper portion for covering the torso of the child seated in the stroller. The upper portion includes a front wall and side walls, each of the side walls including an upper and a lower section. The front wall of the upper portion is attached to the lower sections of the side walls of the upper portion such that the front wall forms a flap which may cover the chest of the child seated in the stroller during particularly cold weather, and which may be folded down during more mild weather and when the child is to exit the stroller. A set of upper fastener strips is attached to the side walls of the upper portion for attaching the blanket to the push handles of the stroller, and a set of lower fastener strips is attached to the side walls of the upper portion for attaching the blanket to the frame of the stroller proximate to the seat of the stroller.

Preferably, the front wall of the upper portion and the front wall of the sack portion are formed from a single piece of material. The blanket preferably also includes a set of front fastener strips for releasably attaching the flap formed by the front wall of the upper portion to the upper sections of the side walls of the upper portion. Most preferably, the set of front fastener strips, the set of upper fastener strips and the set of lower fastener strips are formed from a set of ribbons having hook and loop fasteners attached thereto. Also preferably, the stroller includes a child restraining belt attached to the seat, and the rear wall of the sack portion includes a reinforced slot placed such that the child restraining belt can be passed therethrough and fastened around the child seated in the stroller.

The invention and its particular features and advantages will become more apparent from the following detailed description considered with reference to the accompanying drawings.

BRIEF DESCRIPTION OF THE DRAWINGS

FIG. 2 is a rear isometric view of the dispensing blanket of FIG. 1;

FIG. 3 is a partially cross-sectional side view of the blanket taken along plane 3—3 of FIG. 2;

DETAILED DESCRIPTION OF THE INVENTION

Figure 1:
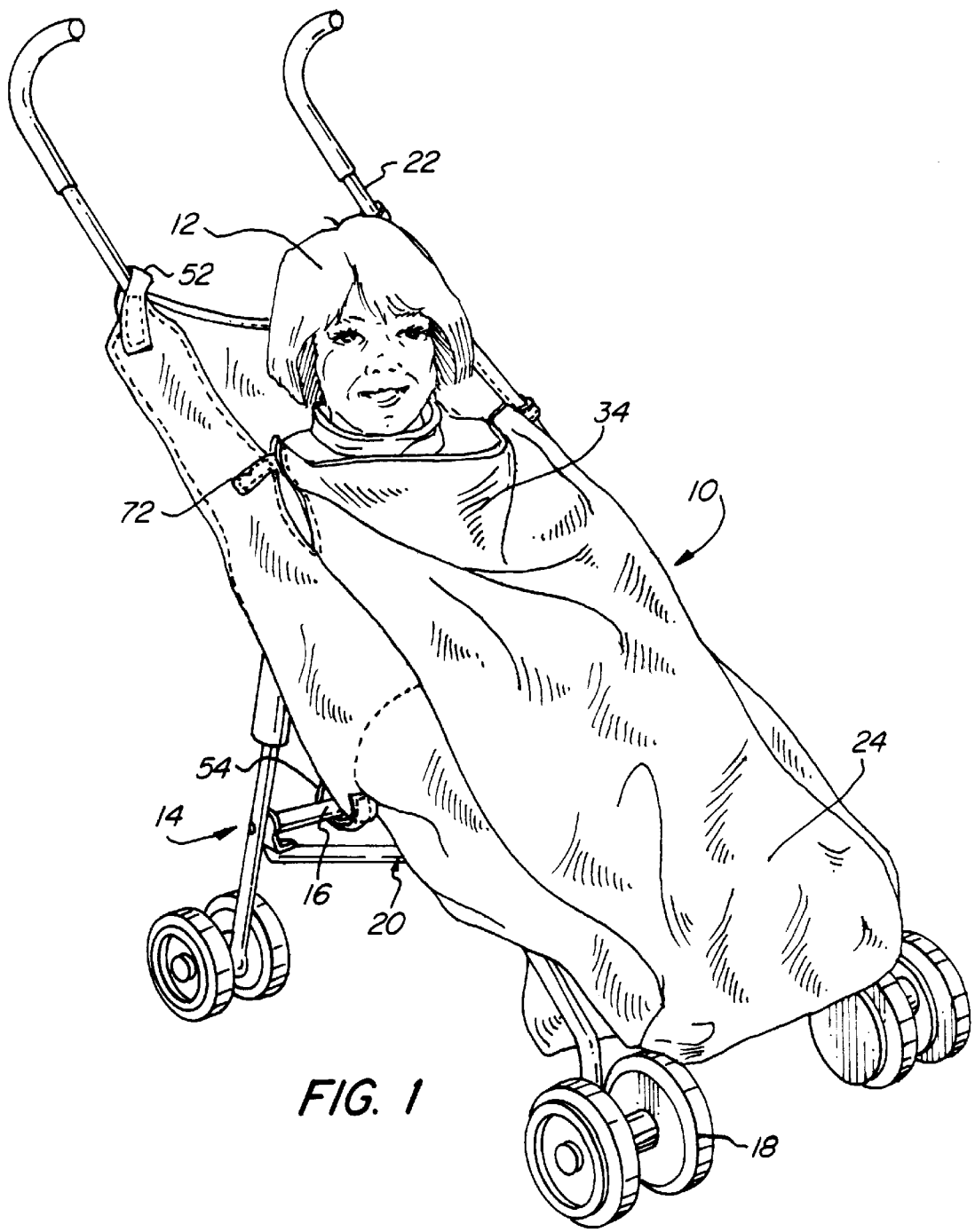
FIG. 1 is a side isometric front view of a blanket in accordance with the present invention attached to a stroller and with a child seated in the stroller.

Referring first to FIGS. 1 through 3, a blanket 10 for warming a child 12 seated in a stroller 14 having a frame 16, wheels 18, a seat 20, and push handles 22 in accordance with the present invention is shown. Blanket 10 includes a sack portion 24 for receiving the legs of the child 12 seated in stroller 14. Sack portion 24 includes side walls 26, a rear wall 28, a front wall 30 and a bottom wall 32, and is sized and shaped to allow for movement of the child's legs therein. Blanket 10 also includes an upper portion 34 for covering the torso of the child 12 seated in stroller 14. Upper portion 34 includes a front wall 36 and side walls 38, each of the side walls including an upper section 40 and a lower 42 section. Front wall 36 of upper portion 34 is attached to lower sections 42 of side walls 38 such that front wall 36 forms a flap 44 which may cover the chest of the child 12 seated in stroller 14 during particularly cold weather, and which may be folded down during more mild weather and when the child 12 is to exit stroller 14.

Figure 4:
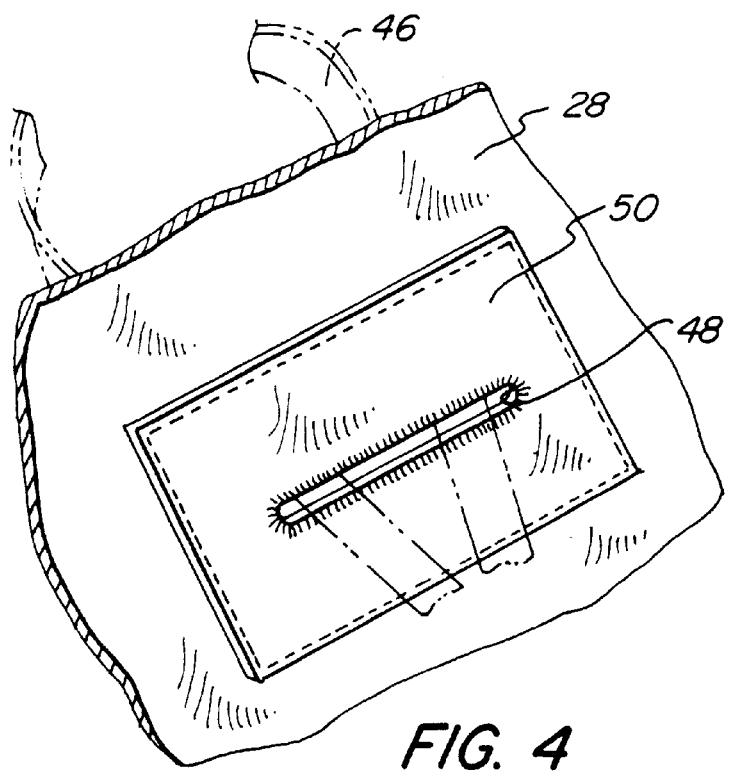
FIG. 4 is an enlarged view of a portion of the blanket of FIG. 1.

Preferably, to facilitate fabrication of blanket 10, front wall 36 of upper portion 34 and front wall 30 of sack portion 24 are formed from a single piece of material. Also, blanket 10 is preferably formed from a fleece fabric so that blanket 10 is comfortable for and effectively warms the child 12. Moreover, as stroller 14 will typically include a child restraining belt 46 (shown in FIG. 4) attached to seat 20, rear wall 28 of sack portion 24 preferably includes a slot 48 located such that child restraining belt 46 can be passed therethrough and fastened around the child 12 seated in stroller 14. Most preferably, slot 48 is reinforced with a piece 50 of fabric attached therearound.

A set of upper fastener strips 52 is attached to side walls 38 of upper portion 34 for attaching blanket 10 to push handles 22 of stroller 14, and a set of lower fastener strips 54 is attached to side walls 38 for attaching blanket 10 to frame 16 proximate to seat 20. Upper fastener strips 52 and lower fastener strips 54 inhibit blanket 10 from falling off the child 12 and inhibit blanket 10 from getting tangled in wheels 18 of stroller 14. Upper and lower fastener strips 52, 54 may comprise ribbons, laces, string, yarn, or the like, which may be tied about a member of stroller 14 to accomplish attachment of blanket 10 thereto. Preferably, however, upper and lower fastener strips 52, 54 include hook and loop fasteners so that blanket 10 is easily attachable to and detachable from stroller 14.

Thus, upper fastener strips 52 would preferably each comprise a ribbon 56 attached at one end to an upper edge 58 of each side wall 38. At the end of ribbon 56 not attached to side wall 38 is either the hook or loop portion of a hook and loop fastener 60. The mating portion 62 of fastener 60 is attached to side wall 38. When blanket 10 is to be attached to stroller 14, each ribbon 56 is wrapped around a push handle 22 and then fastener 60 is attached to mating portion 62, thus securing upper section 40 of side wall 38 to stroller 14. Similarly, lower fastener strips 54 would preferably each comprise a ribbon 64 attached at one end to a rear edge 66 of each side wall 38. At the end of ribbon 64 not attached to side wall 38 is either the hook or loop portion of a hook and loop fastener 68. The mating portion 70 of fastener 68 is attached to side wall 38. When blanket 10 is to be attached to stroller 14, each ribbon 64 is wrapped around frame 16 proximate to seat 20 and then fastener 68 is attached to mating portion 70, thus securing lower section 42 of side wall 38 to stroller 14.

Flap 44 preferably includes a set of front fastener strips 72 for releasably attaching flap 44 to side walls 38. Like upper and lower fastener strips 52, 54, front fastener strips 72 may comprise ribbons, laces, string, yarn, or the like, but preferably include hook and loop fasteners to facilitate opening of flap 44. Thus, front fastener strips 72 would preferably each comprise a ribbon 74 attached at one end to a side edge 76 of flap 44. At the end of ribbon 74 not attached to flap 44 is either the hook or loop portion of a hook and loop fastener 78. The mating portion 80 of fastener 78 is attached to side wall 38. Thus, flap 44 may be closed by attaching fastener 78 to mating portion 80, and may be opened by detaching the same.

Figure 6:
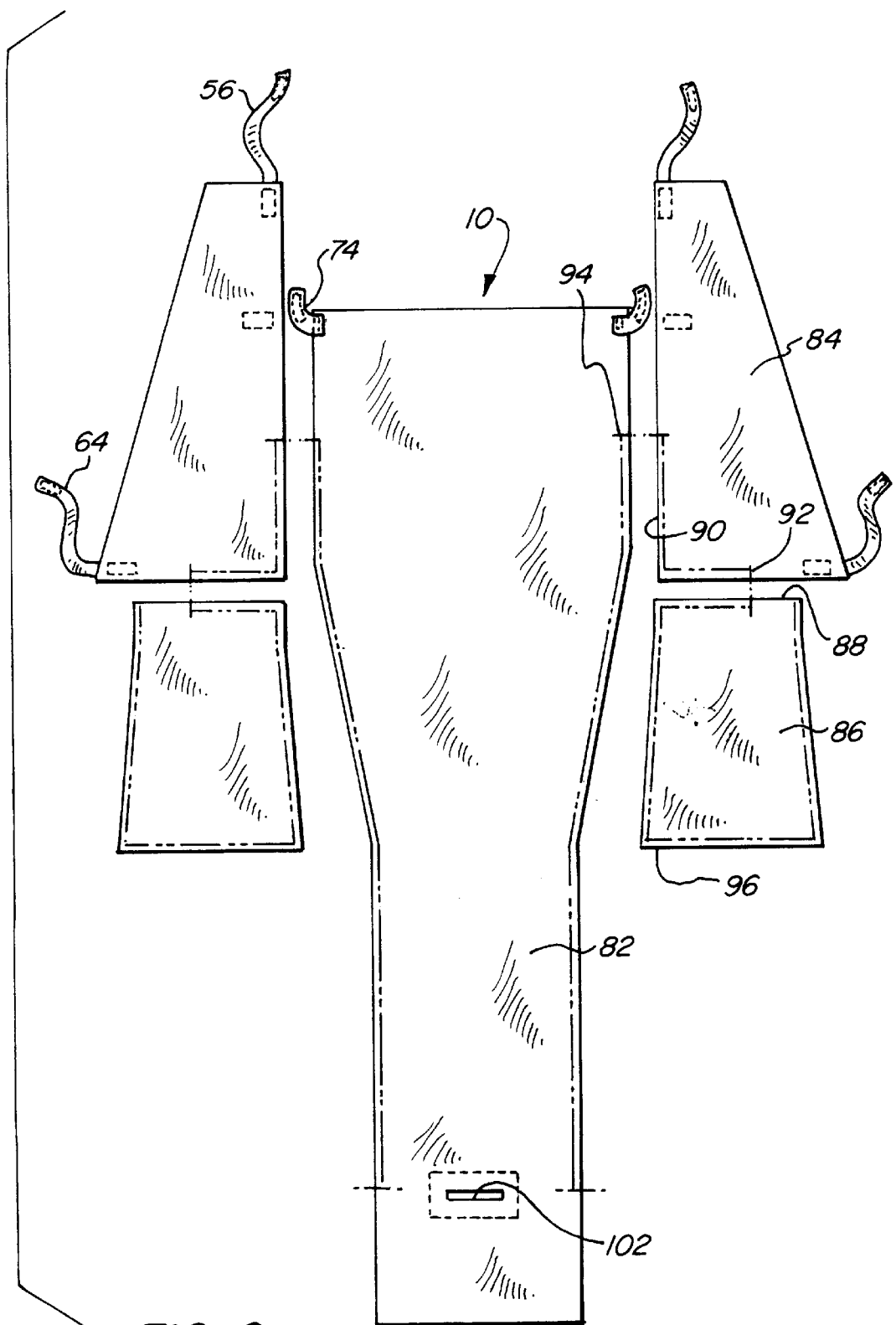
FIG. 6 is a plan view of the components used to form the blanket of FIG. 1 before they are joined.

Referring now to FIG. 6, a method of fabricating a blanket 10 in accordance with the present invention will be discussed. Blanket 10 is constructed by sewing together five pieces of fleece fabric: a front piece 82, two upper side pieces 84 and two lower side pieces 86. Using an approximately one-half inch seam allowance, one upper side piece 84 and one lower side piece 86 are sewn together, matching the notch 88. The seam begins at the front edge 90 and ends at the line 92. The other upper and lower side pieces 84, 86 are sewn together in the same way. Next one joined side piece is sewn to front piece 82. This seam begins at the line 94 and continues down the front of the side piece to the foot 96. At foot 96, the seam turns and continues across foot 96, then turns again and continues up the back of the side piece and ends at the top of lower side piece 86. The second joined side piece is sewn to the other side of front piece 82 in the same way. Now the blanket is in the shape of a bag so that the child's legs can hang inside.

Figure 5:
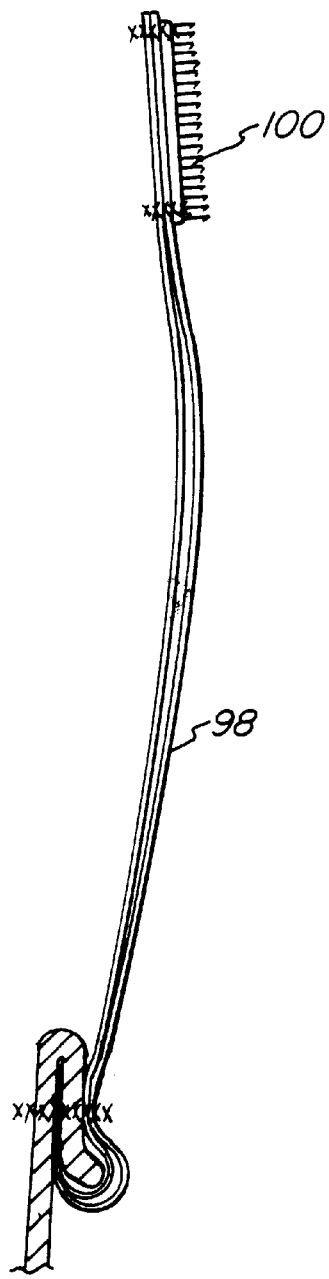
FIG. 5 is an enlarged view of a portion of the blanket of FIG. 1.

After the fleece pieces of blanket 10 are sewn together, all raw fabric edges are clean finished by turning and stitching under approximately one-half inch of fabric. When the edges are turned, the six ribbon attachments described below are sewn into the seams at the locations shown in FIG. 6. It was found that grosgrain ribbon, approximately seven-eighths of an inch wide, is suitable to make the attachments for the blanket 10. Ribbon measurements (before folding) may be as follows: ribbon 56 may be approximately eighteen inches, ribbon 64 may be approximately twenty inches, and ribbon 74 may be approximately five and one-half inches. These dimensions allow for the necessary adjustability for strollers of varying shapes and sizes. As best seen in FIG. 5, each ribbon 98 is folded in half crosswise and at the folded edge of each ribbon is sewn an approximately one and one-half inch long piece 100 of the hook side of a three-quarter inch wide hook and loop fastener. The raw edges of ribbons 98 are sewn to blanket 10 with the hook and loop hooks facing the inside of blanket 10.

Ribbons 74, which are used to open and close flap 44, are sewn to the sides of front piece 82. The approximately one and one-half inch long loop sides of the hook and loop fasteners are sewn to the adjacent parts of upper side pieces 84. Ribbons 56 and 64 are sewn to the upper side pieces 84 and are used to keep the blanket attached to the stroller. Ribbons 56 are attached to the tops of upper side pieces 84.

They wrap around the stroller handles and fasten to the approximately one and one-half inch long loop sides of the hook and loop fasteners which are sewn to the tops of the upper side pieces 84. Blanket 10 hangs from these ribbons. Ribbons 64 are sewn at the bottom of upper side pieces 84. They wrap around the side supports of the stroller frame and fasten to the approximately one and one-half inch long loop sides of the hook and loop fasteners which are sewn at the bottom of upper side pieces 84. These ribbons keep cool air from coming in the sides of blanket 10. Front piece 82 includes an approximately three inch button hole 102. Buttonhole 102 is there so that the stroller's child-restraining belt can pass through blanket 10.

The present invention, therefore, provides a blanket for warming a child seated in a stroller, which does not easily fall off the child seated in the stroller, which does not readily get tangled in the wheels of the stroller, which inhibits drafts of cold air from chilling the child, which is comfortable for the child seated in the stroller, and which is easily attachable to and detachable from the stroller.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A blanket for warming a child seated in a stroller having a frame, wheels, a seat, and push handles, the blanket comprising:
    a sack portion for receiving the legs of a child seated in the stroller, said sack portion having side walls, a rear wall, and a front wall, said sack portion allowing for movement of the child's legs therein;
    an upper portion for covering the torso of a child seated in the stroller, said upper portion having side walls and a front wall attached to the side walls;
    a set of upper fastener strips attached to the side walls of said upper portion for attaching the blanket to the push handles of the stroller; and,
    a set of lower fastener strips attached to the side walls of said upper portion for attaching the blanket to the frame of the stroller proximate to the seat of the stroller, whereby said set of upper fastener strips and said set of lower fastener strips inhibit the blanket from falling off the child and inhibit the blanket from getting tangled in the wheels of the stroller.

2. The blanket of claim 1 wherein the side walls of said upper portion each have an upper and a lower section, and wherein only the lower section of the upper side walls of said upper portion are attached to the front wall of said upper portion such that the front wall of said upper portion comprises a flap which may cover the chest of a child seated in the stroller during particularly cold weather, and which may be folded down during more mild weather and when the child is to exit the stroller.

3. The blanket of claim 2 further comprising a set of front fastener strips for releasably attaching the flap formed by the front wall of said upper portion to the upper sections of the side walls of said upper portion.

4. The blanket of claim 3 wherein the set of front fastener strips comprises a set of ribbons having hook and loop fasteners attached thereto.

5. The blanket of claim 1 wherein the front wall of said upper portion and the front wall of said sack portion are formed from a single piece of material.

6. The blanket of claim 1 wherein the said set of upper fastener strips and said set of lower fastener strips comprise a set of ribbons having hook and loop fasteners attached thereto so that the blanket is easily attachable to and detachable from the stroller.

7. The blanket of claim 1 wherein said sack portion and said upper portion are formed of a fleece fabric so that the blanket is comfortable for and effectively warms the child.

8. The blanket of claim 1 wherein the rear wall of said sack portion includes a slot placed such that a child restraining belt attached to the stroller can be passed therethrough and fastened around the child seated in the stroller.

9. A blanket for warming a child seated in a stroller having a frame, a seat, and push handles, the blanket comprising:
    a sack portion for receiving the legs of a child seated in the stroller, said sack portion having side walls, a rear wall, and a front wall;
    an upper portion for covering the torso of a child seated in the stroller, said upper portion having a front wall and side walls, each of the side walls of said upper portion including an upper and a lower section, the lower section of the side walls of said upper portion being attached to the front wall of said upper portion such that the front wall of said upper portion comprises a flap which may cover the chest of the child seated in the stroller during particularly cold weather, and which may be folded down during more mild weather and when the child is to exit the stroller;
    a set of upper fastener strips attached to the side walls of said upper portion for attaching the blanket to the push handles of the stroller; and,
    a set of lower fastener strips attached to the side walls of said upper section for attaching the blanket to the frame of the stroller proximate to the seat of the stroller.

10. The blanket of claim 9 further comprising a set of front fastener strips for releasably attaching the flap formed by the front wall of said upper portion to the upper sections of the side walls of said upper portion.

11. The blanket of claim 10 wherein the set of front fastener strips comprises a set of ribbons having hook and loop fasteners attached thereto.

12. The blanket of claim 9 wherein the front wall of said upper portion and the front wall of said sack portion are formed from a single piece of material.

13. The blanket of claim 9 wherein the said set of upper fastener strips and said set of lower fastener strips comprise a set of ribbons having hook and loop fasteners attached thereto.

14. The blanket of claim 9 wherein said sack portion and said upper portion are formed of a fleece fabric.

15. The blanket of claim 9 wherein the rear wall includes a slot placed such that a child restraining belt attached to the stroller can be passed therethrough and fastened around the child seated in the stroller.

* * * * *